United States Patent
Morikawa et al.

(10) Patent No.: US 8,334,949 B2
(45) Date of Patent: Dec. 18, 2012

(54) OPTICAL RECORDING DISPLAY MEDIUM AND RECORDING APPARATUS

(75) Inventors: Takashi Morikawa, Ebina (JP); Hiroshi Arisawa, Ebina (JP); Haruo Harada, Ebina (JP); Chisato Urano, Ebina (JP); Yasunori Okano, Tokyo (JP); Atsushi Hirano, Ebina (JP); Taijyu Gan, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 703 days.

(21) Appl. No.: 12/540,675

(22) Filed: Aug. 13, 2009

(65) Prior Publication Data
US 2010/0231829 A1    Sep. 16, 2010

(30) Foreign Application Priority Data
Mar. 10, 2009  (JP) ................ 2009-056354

(51) Int. Cl.
*G02F 1/1347* (2006.01)
*G02F 1/1335* (2006.01)
(52) U.S. Cl. ............ 349/77; 349/78; 349/80; 349/61
(58) Field of Classification Search .......... 349/78, 349/77, 80, 61
See application file for complete search history.

(56) References Cited

U.S. PATENT DOCUMENTS

| | | | | |
|---|---|---|---|---|
| 6,294,313 B1 * | 9/2001 | Kobayashi et al. | ............ | 430/302 |
| 7,238,460 B2 * | 7/2007 | Mizokuro et al. | ....... | 430/270.14 |
| 7,903,324 B2 * | 3/2011 | Kobayashi et al. | ............ | 359/320 |
| 7,976,911 B2 * | 7/2011 | Morikawa et al. | ............. | 428/1.1 |
| 2002/0105628 A1 * | 8/2002 | Saito et al. | ....................... | 355/69 |
| 2009/0159345 A1 * | 6/2009 | Kobayashi et al. | ........ | 178/18.09 |

FOREIGN PATENT DOCUMENTS

| | | |
|---|---|---|
| JP | A-7-320370 | 12/1995 |
| JP | A-10-177191 | 6/1998 |
| JP | A-11-250501 | 9/1999 |
| JP | 2000111942 A * | 4/2000 |
| JP | A-2000-111942 | 4/2000 |
| JP | A-2002-222755 | 8/2002 |
| JP | A-2007-101781 | 4/2007 |
| JP | A-2007-114472 | 5/2007 |
| JP | A-2007-298818 | 11/2007 |

OTHER PUBLICATIONS

Notice of Reasons for Rejection for priority Japanese Patent Application No. 2009-056354, mailed on Jan. 25, 2011 (w/ English translation).

* cited by examiner

*Primary Examiner* — Mike Qi
(74) *Attorney, Agent, or Firm* — Oliff & Berridge, PLC (57) ABSTRACT

An optical recording display medium comprises: a display layer whose display changes according to an applied voltage; a photoconductive layer that is provided opposing the display layer and changes a voltage applied to the display layer according to irradiated light; and a selective transmission layer that is provided on a light path to where light irradiated toward the photoconductive layer arrives at the photoconductive layer, and whose transmissivity with respect to the irradiated light increases as an intensity of the irradiated light increases.

13 Claims, 7 Drawing Sheets

OPTICAL RECORDING DISPLAY MEDIUM AND RECORDING APPARATUS

CROSS-REFERENCE TO RELATED APPLICATIONS

This application is based on and claims priority under 35 U.S.C. 119 from Japanese Patent Application No. 2009-56354, which was filed on Mar. 10, 2009.

BACKGROUND

1. Technical Field

The present invention relates to an optical recording display medium and a recording apparatus.

2. Related Art

As one example of a display medium such as electronic paper, there is an optical recording display medium that displays a recorded image that has been recorded according to irradiated recording light.

SUMMARY

According to and aspect of the present invention, there is provided an optical recording display medium including: a display layer whose display changes according to an applied voltage; a photoconductive layer that is provided opposing the display layer and changes a voltage applied to the display layer according to irradiated light; and a selective transmission layer that is provided on a light path to where light irradiated toward the photoconductive layer arrives at the photoconductive layer, and whose transmissivity with respect to the irradiated light increases as an intensity of the irradiated light increases.

BRIEF DESCRIPTION OF THE DRAWINGS

An exemplary embodiment of the present invention will be described in detail based on the following figures, wherein.

DETAILED DESCRIPTION

1. Configuration

Figure 1A:
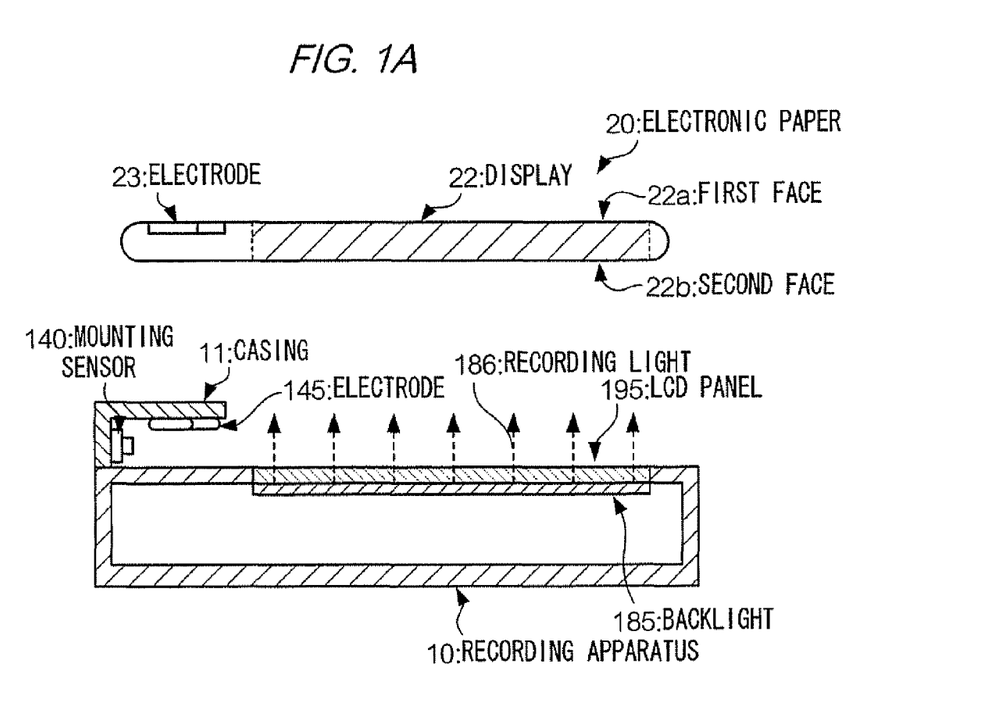
FIG. 1A is a diagram showing a configuration of a recording system according to an exemplary embodiment.
Figure 1B:
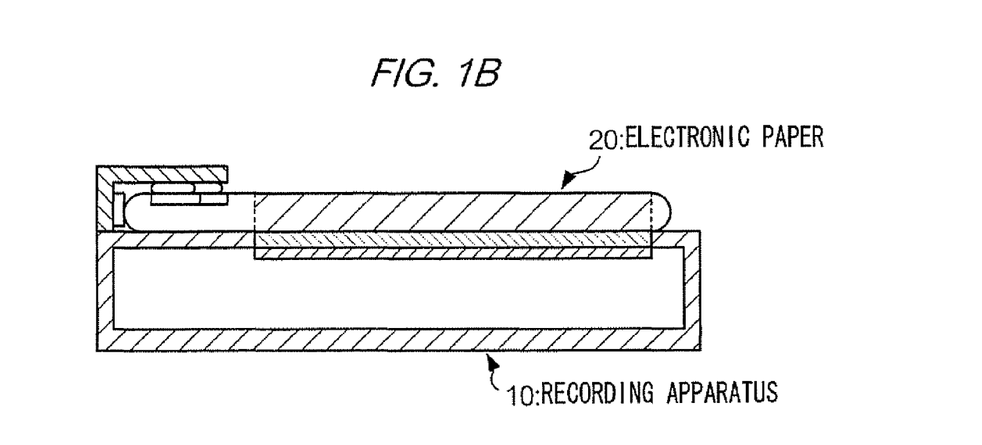
FIG. 1B is another diagram showing the configuration of the recording system according to the exemplary embodiment.

FIGS. 1A and 1B are diagrams showing a configuration of a recording system according to an exemplary embodiment of the present invention. The recording system includes a recording apparatus 10 and a sheet of electronic paper 20. The electronic paper 20 can be mounted on and removed from the recording apparatus 10. FIG. 1A shows a state in which the electronic paper 20 has been removed from the recording apparatus 10, and FIG. 1B shows a state in which the electronic paper 20 has been mounted on the recording apparatus 10. The electronic paper 20 is an optical writing display medium. An "optical writing" display medium refers to a display medium in which the irradiation of light is used when rewriting information displayed on the display medium. The recording apparatus 10 is an apparatus that records images onto the electronic paper 20 (writing) and erases recorded images (initialization).

1-1. Electronic Paper 20

Figure 3:
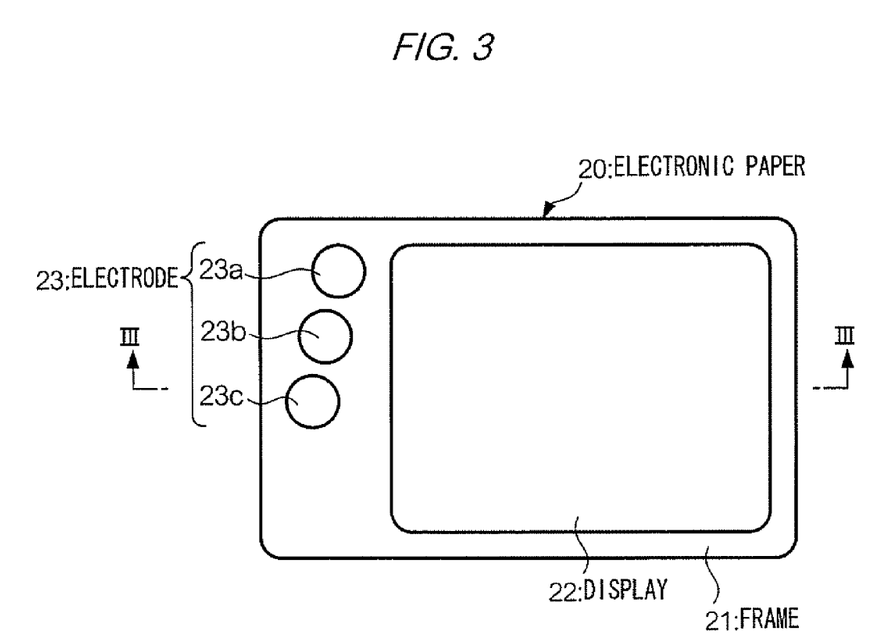
FIG. 3 is an external view of electronic paper as seen from above.

FIG. 3 is an external view of the electronic paper 20 as seen from above. A frame 21 holds constituent elements of the electronic paper 20. The frame 21 is made from a resin that is mechanically rigid and has electrical insulation properties and optical light blocking properties. A display 22 is a structure that displays images. The display 22 includes cholesteric liquid crystal that is a memory liquid crystal. Cholesteric liquid crystal is a bistable substance and maintains either of two orientational states that each have a different light reflectivity even while energy is not being provided by the application of a voltage or the like. The stable orientations of cholesteric liquid crystal molecules include a planar orientation and a focal conic orientation. In the planar orientation, the cholesteric liquid crystal molecules reflect a specified wavelength band of light (Bragg reflection). In the focal conic orientation, the cholesteric liquid crystal molecules transmit light. The display 22 displays images with use of the differences in reflectivity according to the orientational states.

Figure 4:
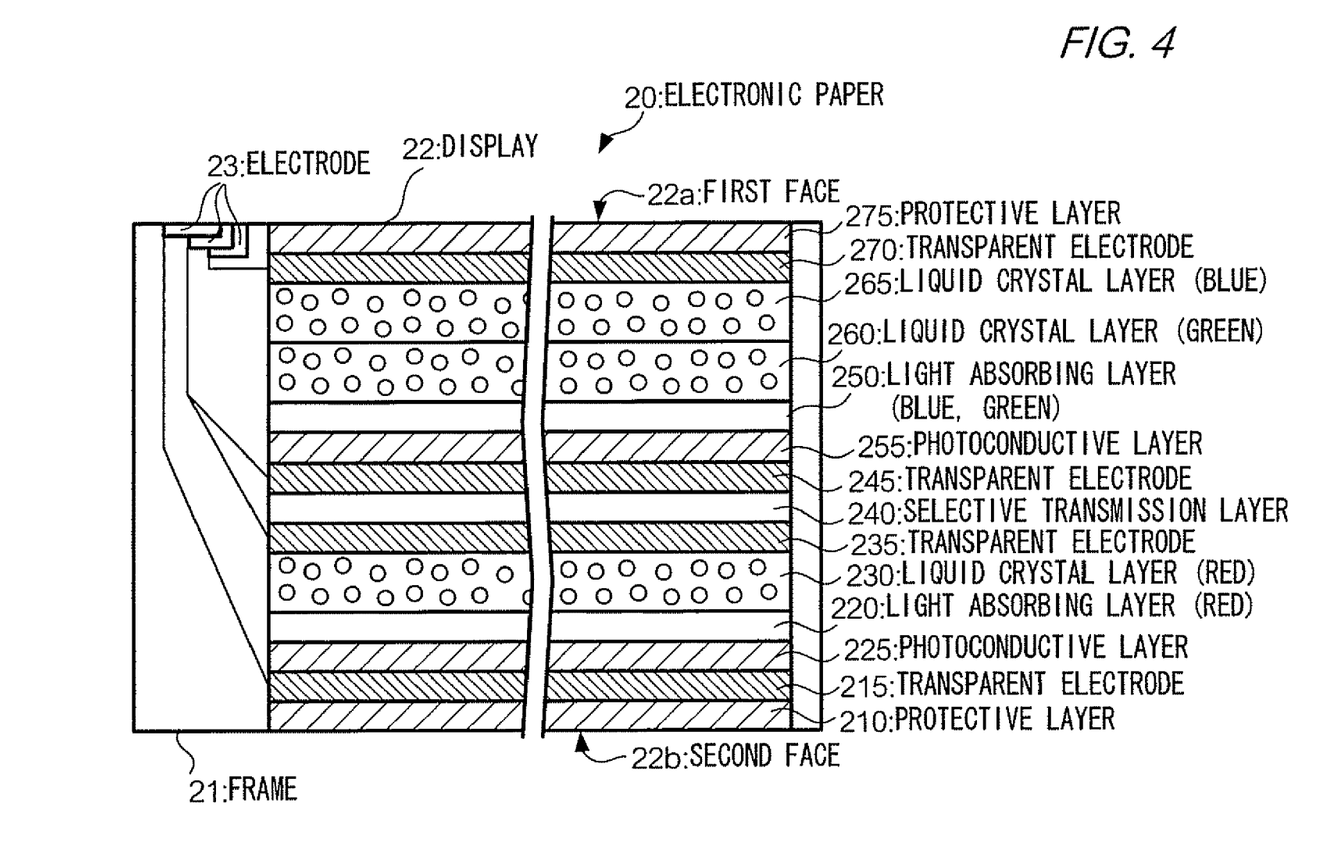
FIG. 4 is a diagram showing a cross-sectional structure of a cross-section of the electronic paper.

FIG. 4 is a diagram showing a cross-sectional structure of a cross-section of the electronic paper 20 taken along a line III-III shown in FIG. 3. A face 22a is a top face, that is to say, the surface (first face) of the display 22. A user views images from the face 22a. A face 22b is a bottom face, that is to say, the back surface (second face) of the display 22. The recording apparatus 10 erases and writes images from the face 22b side.

A protective layer 210 and a protective layer 275 are layers that protect the surfaces of the display 22. In this example, the protective layers 210 and 275 are made from PET (polyethylene terephthalate) resin.

A liquid crystal layer 230, a liquid crystal layer 260, and a liquid crystal layer 265 are layers that include liquid crystal molecules that reflect different specified wavelength bands of light. In this example, the liquid crystal layers 230, 260, and 265 reflect red, green, and blue light respectively. Cholesteric liquid crystal is used in the liquid crystal layers 230, 260, and 265. Specifically, in these layers, microcapsule shaped cholesteric liquid crystal display molecules are dispersed in a binder resin. The light reflectivity of these layers changes according to the orientational state of the cholesteric liquid crystal molecules. The orientational state of the cholesteric liquid crystal molecules changes according to an applied voltage. In other words, the liquid crystal layers 230, 260, and 265 are examples of a display layer whose display changes according to an applied voltage.

Figure 5A:
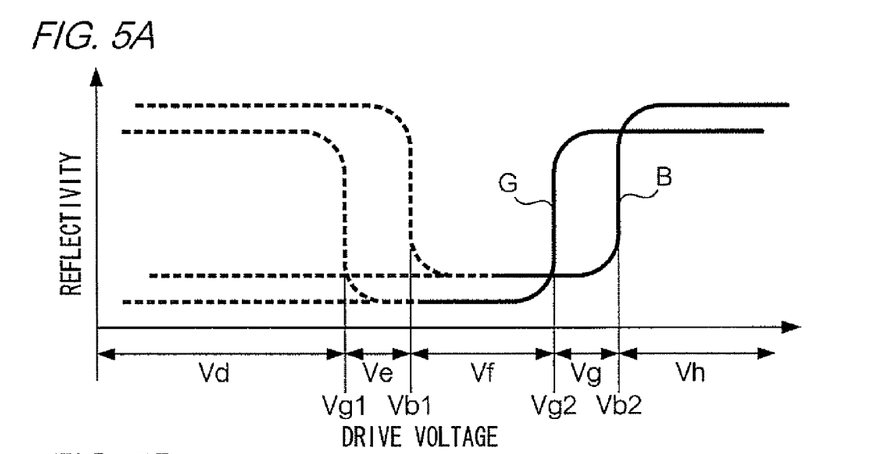
FIG. 5 is a diagram illustrating a principle of displaying a color display.

FIG. 5 is a diagram illustrating a principle by which the electronic paper 20 shown in FIG. 4 displays a color display. In FIG. 5, the vertical axis indicates normalized reflectivities, and the horizontal axis indicates voltages (drive voltages) applied to the liquid crystal layers. As shown in the relationship between drive voltage and reflectivity shown in FIG. 5(a), the phase change threshold voltages of the cholesteric liquid crystal in the liquid crystal layers 260 and 265, whose interfaces are in contact with each other, are respectively considered to be the mutually different voltages Vg1 and Vb1, and Vg2 and Vb2. The example shown in FIG. 5(a) is the case in which it is considered that Vg1<Vb1 and Vg2<Vb2.

Figure 5B:
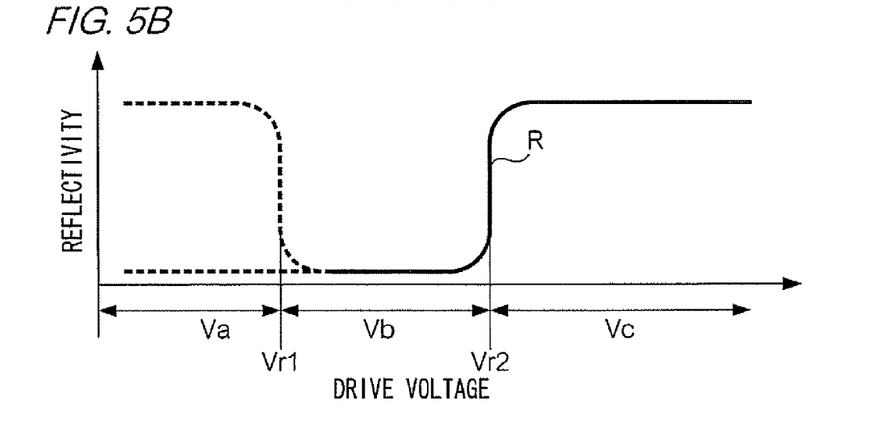
Figure 6:
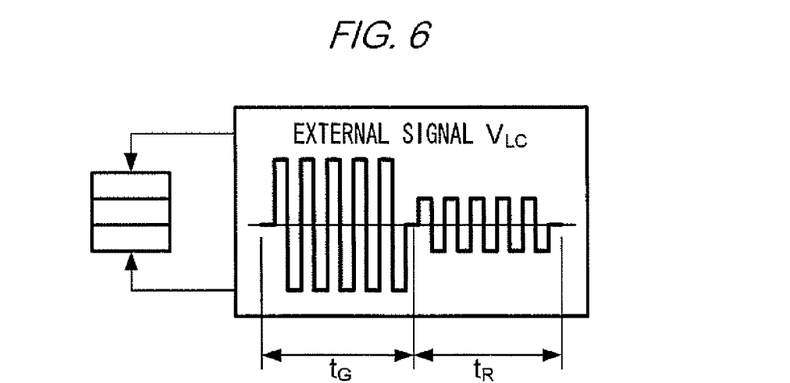
FIG. 6 is a diagram showing an exemplary signal applied to a display.

As shown in the relationship between drive voltage and reflectivity shown in FIG. 5(b), the phase change threshold voltages of the cholesteric liquid crystal in the liquid crystal layer 230 are considered to be voltages Vr1 and Vr2 that are separate from the above threshold voltages Vg1, Vb1, Vg2, and Vb2. Note that the example shown in FIG. 5(b) is the case in which it is considered that Vg1>Vr1 and Vg2>Vr2.

A controller 110 that is described later applies a drive signal between a transparent electrode 270 and a transparent electrode 245, and applies a drive signal between a transparent electrode 235 and a transparent electrode 215. For example, when the controller 110 applies a drive signal between the transparent electrodes 235 and 215 so that the voltage on the liquid crystal layer 230 changes from Vc to Vb to 0V in the stated order, and applies a drive signal between the transparent electrodes 270 and 245 so that the voltage on the liquid crystal layers 260 and 265 changes from Vh to Vf to 0V in the stated order, the liquid crystal layers 230, 260, and 265 all enter a transmissive state, light that has passed through the liquid crystal layers 230, 260, and 265 is absorbed by light absorbing layers 220 and 250, and the color black is displayed.

When the controller 110 applies a drive signal between the transparent electrodes 235 and 215 so that the voltage on the liquid crystal layer 230 changes from Vc to Va to 0V in the stated order, and applies a drive signal between the transparent electrodes 270 and 245 so that the voltage on the liquid crystal layers 260 and 265 changes from Vh to Vd to 0V in the stated order, the liquid crystal layers 230, 260, and 265 all enter a selective reflection state, and the color white is displayed.

When the controller 110 applies a drive signal between the transparent electrodes 235 and 215 so that the voltage on the liquid crystal layer 230 changes from Vc to Vb to 0V in the stated order, and applies a drive signal between the transparent electrodes 270 and 245 so that the voltage on the liquid crystal layers 260 and 265 changes from Vh to Vg to 0V in the stated order, only the liquid crystal layer 260 enters a selective reflection state, and the color green is displayed.

When the controller 110 applies a drive signal between the transparent electrodes 235 and 215 so that the voltage on the liquid crystal layer 230 changes from Vc to Vb to 0V in the stated order, and applies a drive signal between the transparent electrodes 270 and 245 so that the voltage on the liquid crystal layers 260 and 265 changes from Vh to Ve to 0V in the stated order, only the liquid crystal layer 265 enters a selective reflection state, and the color blue is displayed.

When the controller 110 applies a drive signal between the transparent electrodes 235 and 215 so that the voltage on the liquid crystal layer 230 changes from Vc to Va to 0V in the stated order, and applies a drive signal between the transparent electrodes 270 and 245 so that the voltage on the liquid crystal layers 260 and 265 changes from Vh to Vf to 0V in the stated order, only the liquid crystal layer 230 enters a selective reflection state, and the color red is displayed.

Furthermore, when the controller 110 applies a drive signal between the transparent electrodes 235 and 215 so that the voltage on the liquid crystal layer 230 changes from Vc to Vb to 0V in the stated order, and applies a drive signal between the transparent electrodes 270 and 245 so that the voltage on the liquid crystal layers 260 and 265 changes from Vh to Vd to 0V in the stated order, the liquid crystal layers 260 and 265 enter a selective reflection state, and the color cyan is displayed.

When the controller 110 applies a drive signal between the transparent electrodes 235 and 215 so that the voltage on the liquid crystal layer 230 changes from Vc to Va to 0V in the stated order, and applies a drive signal between the transparent electrodes 270 and 245 so that the voltage on the liquid crystal layers 260 and 265 changes from Vh to Vg to 0V in the stated order, the liquid crystal layers 230 and 260 enter a selective reflection state, and the color yellow is displayed.

When the controller 110 applies a drive signal between the transparent electrodes 235 and 215 so that the voltage on the liquid crystal layer 230 changes from Vc to Va to 0V in the stated order, and applies a drive signal between the transparent electrodes 270 and 245 so that the voltage on the liquid crystal layers 260 and 265 changes from Vh to Ve to 0V in the stated order, the liquid crystal layers 230 and 265 enter a selective reflection state, and the color magenta is displayed.

Now returning to FIG. 4, the electronic paper 20 is structured such that the liquid crystal layer 260 (green) and the liquid crystal layer 265 (blue) are sandwiched between a pair of electrodes (transparent electrodes 270 and 245), and the liquid crystal layer 230 (red) is sandwiched between a different pair of electrodes (transparent electrodes 235 and 215). Hereinafter, "first optical address layer" refers to the layers sandwiched between the transparent electrodes 270 and 245, and "second optical address layer" refers to the layers sandwiched between the transparent electrodes 235 and 215.

The first optical address layer includes the liquid crystal layer 265 (blue), the liquid crystal layer 260 (green), the light absorbing layer 250 (blue, green), and a photoconductive layer 255 in the stated order from the face 22a side. The transparent electrodes 270 and 245 are electrodes for applying a voltage to the first optical address layer. The transparent electrodes 270 and 245 are made from a material that transmits light (transparency refers to having a light transmissivity that is greater than a predetermined threshold value), such as ITO (Indium Tin Oxide). Although the photoconductive layer 255 has a high resistance compared to the liquid crystal layers 260 and 265 when not being irradiated by light, a charge is generated and the resistance decreases when the photoconductive layer 255 is irradiated by a specified wavelength of light (e.g., blue light having a wavelength peak at 480 nm) from the face 22b side. In this example, the photoconductive layer 255 is formed from an OPC (Organic Photoconductor). In a dark state, almost all of the voltage applied between the transparent electrodes 270 and 245 is on the photoconductive layer 255, and the voltage is not on the liquid crystal layers 260 and 265. When irradiated by the blue light described above, the resistance of the photoconductive layer 255 decreases, and the voltage is on the liquid crystal layers 260 and 265. The transparent electrodes are formed over the entire face of the first optical address layer, and even if a voltage is applied to the entire first optical address layer, the application of the voltage to the liquid crystal layers only occurs in a portion that has been irradiated by light. In other words, the photoconductive layer 255 is an example of a photoconductive layer that is provided opposing the liquid crystal layers 260 and 265 and, in accordance with irradiated light, changes a voltage applied to the liquid crystal layers 260 and 265. Also, by providing the photoconductive layer 255, it is possible to use the presence or absence of light irradiation to select an area of the first optical address layer in which an image is to be written (i.e., the orientation of the liquid crystal is to be changed). Hereinafter, "recording light" refers to light irradiated on the photoconductive layer in order to write an image. Furthermore, it is possible to select the liquid crystal layer for writing an image, with use the value of the voltage that is applied between the transparent electrodes 270 and 245 at this time. In this way, by combining the light irradiation and voltage application, it is possible to control the orientation of the liquid crystal in a specified area of a specified layer, that is to say, it is possible to form an image. In the photoconductive layer 255, a material that transmits red (the complimentary color of the color reflected by the first optical address layer) light, such as DBA (dibromo anthanthrone) is used as the charge generating substance. The blue recording light described above that is irradiated onto the photoconductive layer 255 is absorbed by this charge generating substance, thus causing the generation of a charge.

The light absorbing layer 250 between the liquid crystal layer 260 and the photoconductive layer 255 is a layer that absorbs the wavelength band of light that is reflected by the liquid crystal layers 265 and 260 (in this example, blue to green light). The above-described blue recording light that is irradiated onto the photoconductive layer 255 is also light that belongs to the above wavelength band, and since the light absorbing layer 250 is provided more toward the face 22b than the liquid crystal layers 265 and 260, the blue recording light is blocked by the light absorbing layer 250 so as to not reach the liquid crystal layers 265 and 260.

Also, the liquid crystal layer 230 that is described later is highly viewing angle dependent due to developing a color with use of cholesteric liquid crystal, and there are cases in which, as the angle from which the user observes the face 22a increases with respect to straight on, the developed color changes from red to blue and green, that is to say, a phenomenon called "blue shift" occurs. Since the light absorbing layer 250 absorbs blue and green light that has been developed due to this phenomenon, blue and green light originating from the above-described blue shift when the electronic paper 20 is tilted does not reach the observer, thereby improving the visibility of an image displayed on the display 22.

The second optical address layer includes the liquid crystal layer 230 (red), the light absorbing layer 220 (red), and a photoconductive layer 225 in the stated order from the face 22a side. The transparent electrodes 235 and 215 are electrodes for applying a voltage to the second optical address layer. The transparent electrodes 235 and 215 are made from ITO. Although the photoconductive layer 225 has a high resistance compared to the liquid crystal layer 230 when in a dark state, a charge is generated and the resistance decreases when the photoconductive layer 225 is irradiated by a specified wavelength of recording light (e.g., red recording light having a wavelength peak at 650 nm) from the face 22b side. Similarly to the photoconductive layer 255, the photoconductive layer 225 is formed from OPC. As described regarding the first optical address layer, a red image can be formed in the second optical address layer by light irradiation. In other words, the photoconductive layer 225 is an example of a photoconductive layer that is provided opposing the liquid crystal layer 230 and, in accordance with irradiated light, changes a voltage applied to the liquid crystal layer 230. In the photoconductive layer 225, a material that transmits blue to green (the complimentary colors of the color reflected by the second optical address layer) light, such as TiOPC (titanium oxide phthalocyanine) is used as the charge generating substance. The red recording light described above that is irradiated onto the photoconductive layer 225 is absorbed by this charge generating substance, thus causing the generation of a charge.

The light absorbing layer 220 between the liquid crystal layer 230 and the photoconductive layer 225 is a layer that absorbs the wavelength band of light that is reflected by the liquid crystal layer 230 (in this example, red light). The above-described red recording light that is irradiated onto the photoconductive layer 225 is also light that belongs to the above wavelength band, and since the light absorbing layer 220 is provided more toward the face 22b than the liquid crystal layer 230, the red recording light is blocked by the light absorbing layer 220 so as to not reach the liquid crystal layer 230. On the other hand, the above-described blue recording light is not light that belongs to the above wavelength band, and therefore passes through the light absorbing layer 220.

A selective transmission layer 240 is sandwiched between the transparent electrodes 245 and 235, and is provided in the light path from the face 22b side to where the blue recording light irradiated toward the first optical address layer arrives at the first optical address layer The selective transmission layer 240 has the following two functions.

The first function of the selective transmission layer 240 is, when irradiated recording light passes through the selective transmission layer 240, to make the spot diameter of the light at the time of exit smaller than the spot diameter of the light at the time of incidence. Specifically, the selective transmission layer 240 transmits the high-intensity light component of the blue recording light irradiated from the face 22b side, and absorbs the low-intensity light component thereof According to this effect, due to the fact that the surface potential curve with respect to the exposure amount of the optical address layer has the characteristic that there is virtually a sharp rise (high γ) with respect to a specified light amount, the diameter of the surface potential spot generated due to the exposure becomes smaller than the exposure spot diameter.

Figure 7:
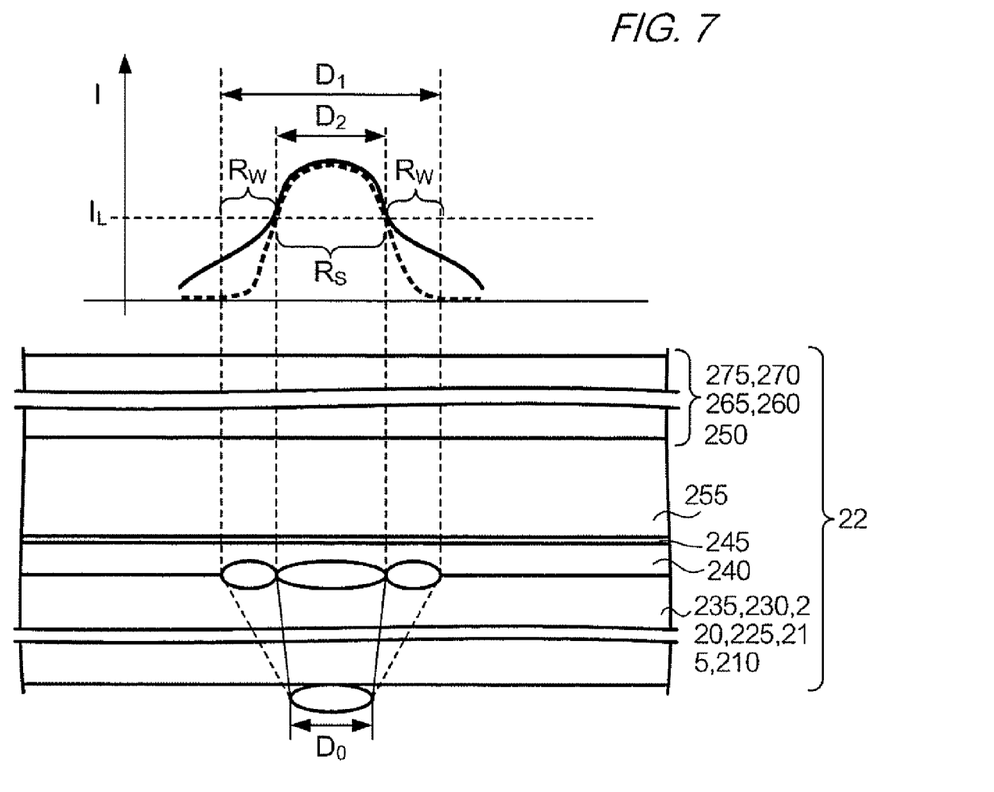
FIG. 7 is a diagram for describing functions of a selective transmission layer that reduces the spot diameter of recording light.

FIG. 7 is a diagram for describing the functions of the selective transmission layer 240 that reduces the spot diameter of recording light. As shown in the lower portion of FIG. 7, the blue recording light described above is irradiated from the recording apparatus 10 to the face 22b side of the display 22 with a spot diameter $D_0$, and before reaching the selective transmission layer 240, passes through the protective layer 210, then the transparent electrode 215, then the photoconductive layer 225, then the light absorbing layer 220, then the liquid crystal layer 230, and then the transparent electrode 235. While passing through these layers, the recording light beam is dispersed, and therefore at the time of incidenting on the selective transmission layer 240, the spot diameter of the recording light has increased from $D_0$ to $D_1$. The upper portion of FIG. 7 is a graph showing the position and light intensity of the recording light at the time of incidenting on the selective transmission layer 240. The horizontal axis in this graph indicates the irradiation position of the recording light in the display 22 shown in the lower portion of FIG. 7, and the vertical axis in this graph indicates the light intensity of the recording light. The solid line in this graph indicates the recording light at the time of incidenting on the selective transmission layer 240, and the broken line indicates the recording light at the time of exiting the selective transmission layer 240. As shown in FIG. 7, at the time of incidenting on the selective transmission layer 240, light in the peripheral portion of the recording light spot diameter is weak due to being stray light and scattered light, and light in the central portion of the recording light spot diameter is intense. Since the transmissivity with respect to the recording light is low in an area Rw in the selective transmission layer 240 in which the recording light intensity is less than $I_L$, a sufficient amount of recording light for decreasing the resistance of the photoconductive layer 255 is not transmitted. On the other hand, since the transmissivity with respect to the recording light increases in an area Rs in the selective transmission layer 240 in which the recording light intensity exceeds $I_L$, a sufficient amount of recording light for decreasing the resistance of the photoconductive layer 255 is transmitted. Accordingly, weak light in the peripheral portion shown in the area Rw is absorbed by the selective transmission layer 240 and weakens, and almost all of the intense light in the central portion shown in the area Rs is transmitted, and therefore the spot diameter $D_2$ at the time of exiting the selective transmission layer 240 is smaller than the spot diameter $D_1$ at the time of incidenting on the selective transmission layer 240. The blue recording lighting having a reduced spot diameter is then irradiated onto the photoconductive layer 255 in the first optical address layer, and thus an image is written in the first optical address layer. The spot diameter that reduced the resistance of the optical address layer is further reduced, the amount of image blurring that occurs due to stray light and scatter light is reduced, and the resolution of the image to be recorded is improved. This function is realized by utilizing, for example, the characteristics (multiphoton absorption property) of a photochromic compound.

A photochromic compound is a compound whose light transmissivity reversibly changes according to an irradiation of light. There are some photochromic compounds that have a characteristic in which, when irradiated by light, there is a reversible change between two states having different absorption spectrums, without a change in molecular weight due to isomerizing. For example, there are some diarylethene derivatives, which are photochromic compounds, that develop the color red when irradiated by ultraviolet light and become transparent when then irradiated by visible light. The diarylethene derivative develops the color red due to the diarylethene derivative isomerizing into a steric structure that absorbs cyan, which is the complimentary color of red. The wavelength band of this cyan light includes the above-described blue recording light that is irradiated onto the photoconductive layer 255. Accordingly, by including this diarylethene derivative in the selective transmission layer 240 and causing the diarylethene derivative to enter a color developing state by irradiation with ultraviolet light, it is possible to reduce the spot diameter of the blue recording light described above.

Figure 8:
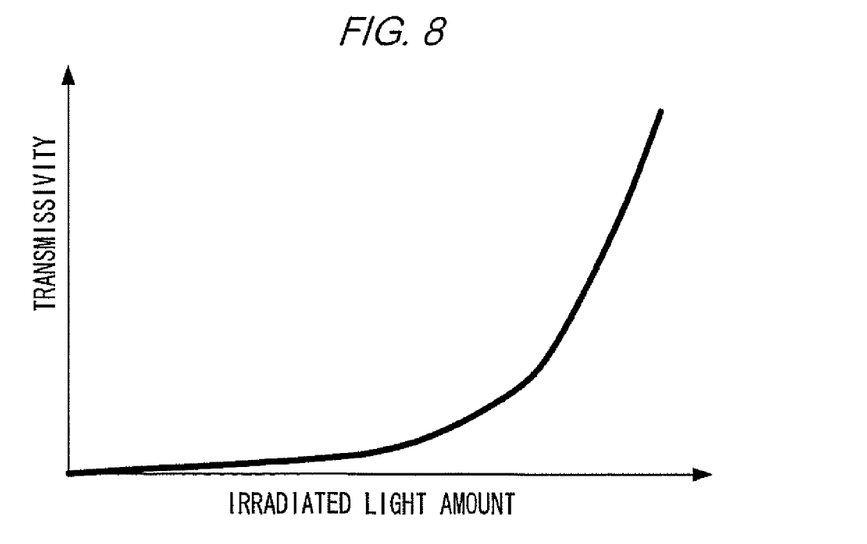
FIG. 8 is a diagram showing a relationship between the transmissivity of a diarylethene derivative and the amount of light irradiated thereon.

FIG. 8 is a diagram showing a relationship between the transmissivity of a diarylethene derivative that is a typical photochromic compound having the below structure formula, and an amount of light irradiated thereon.

As shown in FIG. 8, the diarylethene derivative has a characteristic in which there is almost no change in the transmissivity of the diarylethene derivative when the irradiated light amount is low (single photo absorption process), and as the irradiated light amount increases, there is a drastic change (multiphoton absorption process), and the transmissivity increases nonlinearly with respect to the irradiated light amount. Note that although a photochromic compound whose optical physical properties reversibly change due isomerizing is used here, it is possible to use a photochromic compound whose optical physical properties reversibly change due to a change in another factor, such as the conformation, according to irradiation by light.

This first function is realized due to such a photochromic compound being dispersed and contained in the selective transmission layer 240. In other words, the selective transmission layer 240 is an example of a selective transmission layer that is provided on a light path to where light irradiated toward the photoconductive layer 255 has reached the photoconductive layer 255, and whose light transmissivity increases as the intensity of irradiated light increases.

The selective transmission layer 240 has a second function of insulating the transparent electrodes 245 and 235. In this example, the second function is realized due to the selective transmission layer 240 being formed from PET. In other words, in this example, the selective transmission layer 240 is formed from a transparent resin having insulation properties, such as PET, in which a photochromic compound such as a diarylethene derivative has been dispersed.

An electrode 23 is a contact point where an electrical signal from the recording apparatus 10 is received. In this example, the electrode 23 includes three electrodes, namely electrodes 23a, 23b, and 23c. The electrode 23b is an electrode that is subjected to a ground potential. A voltage is applied to the first optical address layer via the electrodes 23a and 23b, and a voltage is applied to the second optical address layer via the electrodes 23b and 23c. The electrode 23 is disposed at a position so as to be in electrical contact with an electrode 145 on the recording apparatus 10 side when the electronic paper 20 is mounted on the recording apparatus 10 as shown in FIG. 1B.

Figure 9:
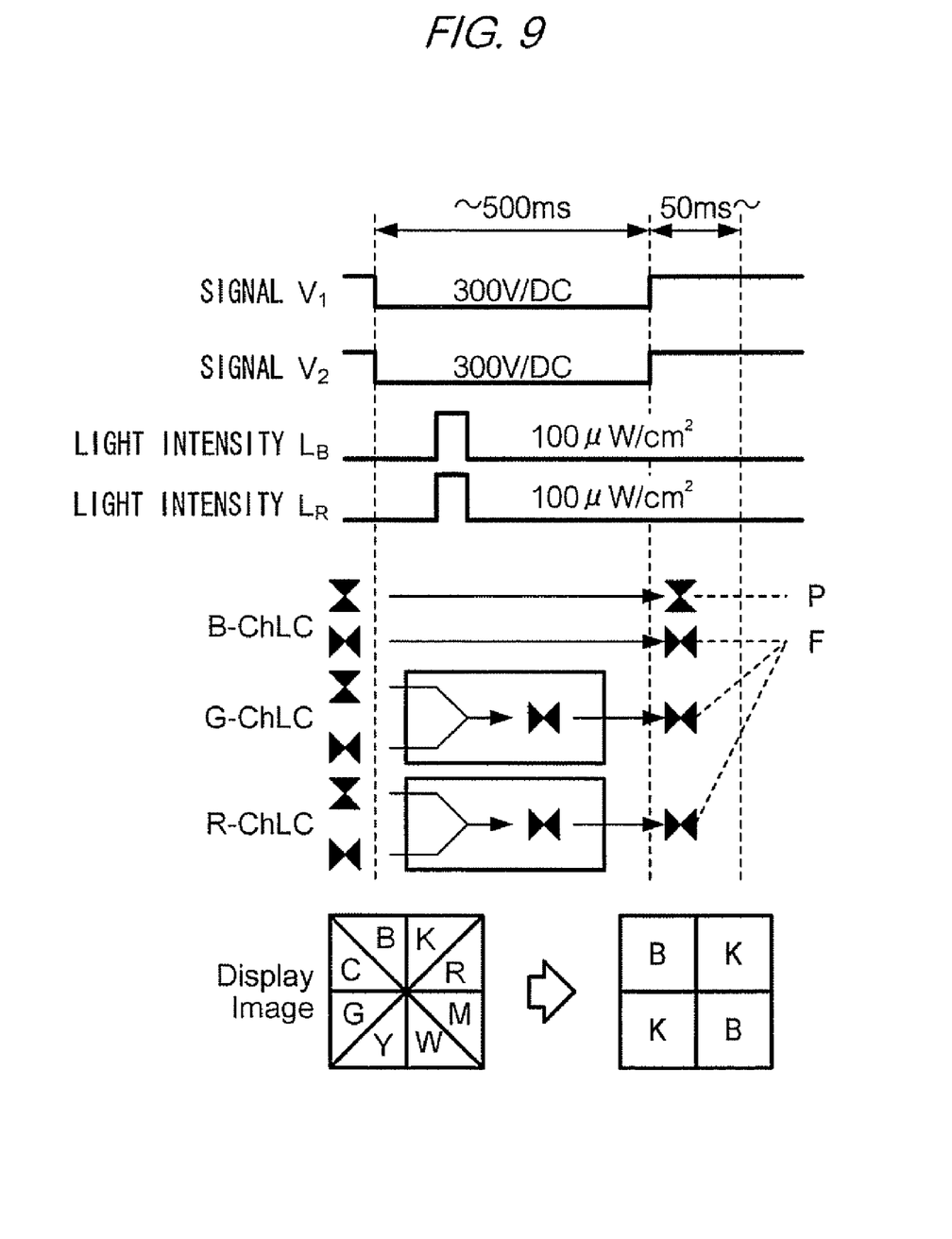
FIG. 9 is a diagram showing an example of rewriting the display of the electronic paper by the recording apparatus.

FIG. 9 is a diagram showing an example of rewriting the display of the electronic paper 20 by the recording apparatus 10. A signal $V_1$ and a signal $V_2$ indicate voltages that are applied to the first optical address layer and the second optical address layer respectively. In this example, the signals $V_1$ and $V_2$ are set such that a voltage of 300 V is applied in a pulse waveform having a frequency of 50 Hz over 500 msec. Accordingly, when the blue recording light is irradiated onto the first optical address layer, a voltage is on the liquid crystal layer 265 (blue) and the liquid crystal layer 260 (green) such that the orientation of the liquid crystal layer 265 (blue) is maintained, and the orientation of the liquid crystal layer 260 (green) changes to the focal conic orientation (i.e., a voltage in the range of Ve shown in FIG. 5). Also, when the red recording light is irradiated on the second optical address layer, a voltage is on the liquid crystal layer 230 (red) such that the orientation of the liquid crystal layer 230 (red) changes to the focal conic orientation (i.e., a voltage in the range of Vb shown in FIG. 5). A light intensity $L_B$ and a light intensity $L_R$ indicate the intensities of the blue and red recording light respectively. In this example, blue light (wavelength=480 nm) and red light (wavelength=650 nm) having an intensity of 100 μW/cm² is irradiated onto the display 22. B-ChLC, G-ChLC, and R-ChLC, indicate the orientational states of the liquid crystal layer 265 (blue), the liquid crystal layer 260 (green), and the liquid crystal layer 230 (red) respectively. F indicates the focal conic orientation, and P indicates the planar orientation. In this example, there is no change in the orientational state of the liquid crystal layer 265 (blue) before and after the voltage application and light irradiation, but the orientational state of the liquid crystal layer 260 (green) and the liquid crystal layer 230 (red) changes to the focal conic orientation due to the voltage application and light irradiation.

The lower portion of FIG. 9 shows display states before and after voltage application and light irradiation. B, C, G, Y, W, M, R, and K respectively indicate blue, cyan, green, yellow, white, magenta, red, and black. For example, in an area in which red was displayed, the orientational state of the three liquid crystal layers is (R,G,B)=(P,F,F). In this example, the orientation of the liquid crystal layer 260 (green) and the liquid crystal layer 230 (red) changes to the focal conic orientation due to the voltage application and light irradiation, and therefore the orientational state of the three liquid crystal layers becomes (R,G,B)=(F,F,F). In other words, the area in which red was displayed becomes black. Similarly, due to the voltage application and light irradiation, green areas and yellow areas become black, and cyan areas, white areas, and magenta areas become blue. Blue areas and black areas do not change. In this way, black or blue images are recorded on the electronic paper 20 with use of the recording apparatus 10.

1-2. Recording Apparatus 10

The following describes the recording apparatus 10 with reference to FIG. 1A. A casing 11 has the function of holding constituent elements of the recording apparatus 10, the function of blocking external light from entering the interior of the recording apparatus 10 (particularly the portion for recording images onto the electronic paper 20), and the function of holding the electronic paper 20 when the user has mounted the electronic paper 20 on the recording apparatus 10. In this example, the casing 11 is manufactured from a resin such as engineering plastic.

Figure 2:
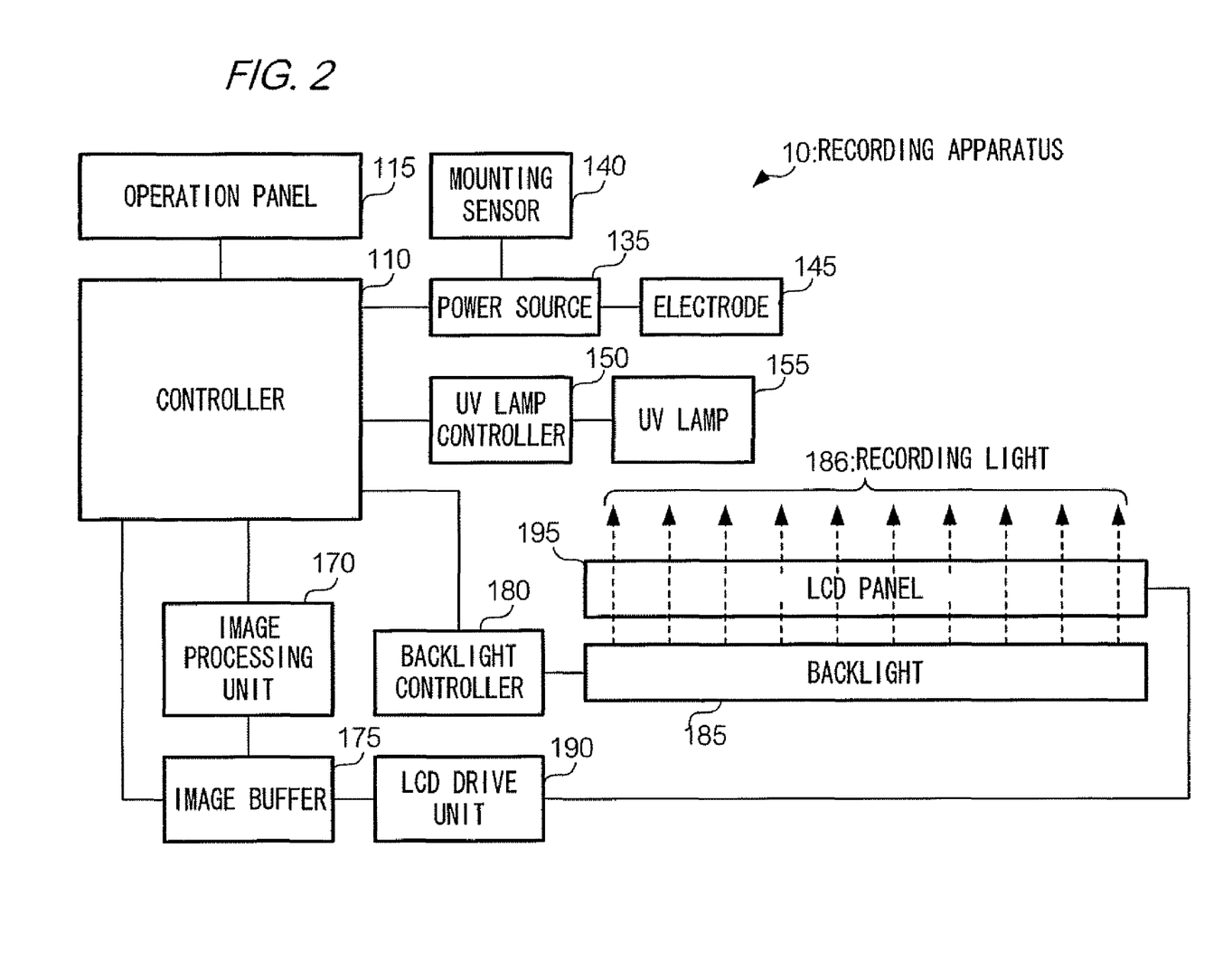
FIG. 2 is a diagram showing a configuration of a recording apparatus.

FIG. 2 is a diagram showing a configuration of the recording apparatus 10. A controller unit 110 is a control apparatus that controls elements of the recording apparatus 10. In this example, the controller 110 is a computer that includes a CPU (Central Processing Unit) as a computation apparatus, an HDD (Hard Disk Drive), a ROM (Read Only Memory), and a RAM (Random Access Memory) as storage apparatuses, and an I/O port as an input/output apparatus. The HDD and ROM store a program and various types of data for controlling the recording apparatus 10. The CPU controls the operations of units in the recording apparatus 10 by reading the program from the HDD or ROM and executing the program. The CPU also uses the RAM as a work area when executing the program.

An operation panel 115 receives an instruction operation from the user, and outputs a signal corresponding to the received operation to the controller 110. The operation panel 115 includes an input apparatus for receiving an input of an instruction from the user (e.g., a power switch or a numeric keypad) and a display apparatus for providing the user with information (e.g., a display lamp or a liquid crystal display).

A power source 135 supplies power to the controller 110, the electrode 145 (i.e., the electronic paper 20), and the like. A mounting sensor 140 detects whether the electronic paper 20 is mounted on the recording apparatus 10, and outputs a result of the detection to the controller 110. In this example, a push button switch is used as the mounting sensor 140. As shown in FIG. 1A, the push button switch is not depressed if the electronic paper 20 is not mounted on the recording apparatus 10. As shown in FIG. 1B, the push button switch is depressed when the electronic paper 20 is mounted. The electrode 145 has three terminals. These three terminals respectively correspond to the electrodes 23a, 23b, and 23c of the electronic paper 20. The electrode 145 is used to supply a voltage generated by the power source 135 to the electronic paper 20. The electrode 145 is disposed at a position so as to be in electrical contact with the electrode 23 of the electronic paper 20 when the electronic paper 20 is mounted on the recording apparatus 10 as shown in FIG. 1B.

Under the control of the controller 110, an image processing unit 170 processes image data indicating an image to be rendered on an LCD panel 195. The image processing unit 170 outputs processed image data to an image buffer 175. Examples of the image processing performed by the image processing unit 170 include superimposing images, superimposing an image and characters, and changing display colors. The image buffer 175 is a VRAM (Video Random Access Memory) that stores image data.

A backlight controller 180 drives a backlight 185 under the control of the controller 110. Under the control of the backlight controller 180, the backlight 185 generates light that is irradiated onto the LCD panel 195. In this example, the light from the backlight 185 includes a red spectrum whose wavelength peak is 650 nm and a blue spectrum whose wavelength peak is 480 nm. Specifically, the backlight 185 includes a cold cathode tube that generates white light.

An LCD drive unit 190 causes an image to be displayed by reading image data stored in the image buffer 175 and driving the LCD panel 195 in accordance with the read image data. In other words, the LCD panel 195 is a transmissive color liquid crystal panel that selectively transmits light from the backlight 185. In particular, the LCD panel 195 selectively transmits red light whose wavelength peak is 650 nm and blue light whose wavelength peak is 480 nm.

A UV lamp controller 150 drives a UV lamp 155 under the control of the controller 110. Under the control of the A lamp controller 150, the A lamp 155 generates ultraviolet light that is irradiated onto the electronic paper 20. In this example, the ultraviolet light irradiated from the UV lamp 155 has a wavelength peak of, for example, 365 nm, and this ultraviolet light causes the photochromic compound included in the selective transmission layer 240 to isomerize and develop the color red. As a result, there is a reduction in the transmissivity of the selective transmission layer 240 with respect to the blue recording light irradiated from the recording apparatus 10. In other words, the UV lamp 155 is an example of a color developing unit that causes the selective transmission layer in the display medium to develop a color by irradiating electromagnetic waves (in this case, ultraviolet light) having a different wavelength from recording light onto the selective transmission layer. Note that although the UV lamp 155 is provided in the recording apparatus 10 so as to irradiate ultraviolet light from the face 22a side (i.e., the surface side) of the display 22 in this example, the UV lamp 155 may be provided so as to irradiate ultraviolet light from the face 22b side (i.e., the back face side) of the display 22.

2. Operations 2-1. Recording to the Electronic Paper 20

Recording to the electronic paper 20 is performed while the electronic paper 20 is mounted on the recording apparatus 10. The controller 110 controls the UV lamp controller 150 to light the UV lamp 155. Ultraviolet light irradiated from the UV lamp 155 reaches the selective transmission layer 240 of the electronic paper 20, and the photochromic compound included in the selective transmission layer 240 isomerizes and develops the color red.

Next, the controller 110 transmits data indicating an image to be recorded on the electronic paper 20, such as image data stored in the HDD, to the image processing unit 170. The image processing unit 170 separates the image data into color components corresponding to the liquid crystal layers (here, R, G, and B). The image processing unit 170 also performs processing such as resolution conversion and the addition of brightness information. The image processing unit 170 transmits image data that has been processed in this way to the image buffer 175. The LCD drive unit 190 reads data from the image buffer 175 and controls the LCD panel 195 in accordance with the content of the read data. Also, in synchronization with the control of the LCD panel 195, the controller 110 controls the backlight controller 180 to light the backlight 185. As a result, the backlight 185 and the LCD panel 195 transmit red recording light whose wavelength peak is 650 nm at positions of red (R) color components in the image data, and transmits blue recording light whose wavelength peak is 480 nm at positions of green (G) and blue (B) color components in the image data. In other words, the backlight 185 and LCD panel 195 are an example of an irradiation unit that irradiates light onto the display medium.

Furthermore, in synchronization with the control of the backlight 185, the controller 110 controls the power source 135 to apply a drive voltage to the first optical address layer and to the second optical address layer. In other words, the power source 135 is an example of a voltage application unit that applies a voltage to the display medium. Specifically, the controller 110 applies a predetermined voltage to the electrodes 23b and 23c via the electrode 145 at positions of red (R) color components in the image data. As a result, a predetermined voltage is applied at positions in the second optical address layer that correspond to the positions described above, and at these positions, the resistance of the photoconductive layer 225 decreases, the orientation of the liquid crystal layer 230 changes to the planar orientation, and the color red is developed. Also, at positions of green (G) and blue (B) color components in the image data, the controller 110 applies predetermined voltages to the electrodes 23b and 23a via the electrode 145 in a predetermined order, and each predetermined voltage is in accordance with the corresponding color component. As a result, predetermined voltages that correspond to green (G) and blue (B) are applied at positions in the first optical address layer that correspond to the positions described above in the predetermined order, and the resistance of the photoconductive layer 225 decreases at these positions. If these voltages and the order correspond to green (G), the orientation of the liquid crystal layer 260 changes to the planar orientation and the color green is developed, and if the these voltages and the order correspond to blue (B), the orientation of the liquid crystal layer 265 changes to the planar orientation and the color blue is developed.

In this way, an image is recorded (written) to the electronic paper 20 by controlling the light irradiated onto and the voltage applied to the liquid crystal layers 265, 260, and 230. The controller 110, backlight controller 180, and LCD drive unit 190 are an example of a controller that controls the irradiation unit and the voltage application unit according to image data received as input.

3. Other Exemplary Embodiments

The present invention is not limited to the exemplary embodiment described above. The present invention can be implemented by various embodiments as described below. Two or more of the variations described below may be used in combination.

3-1. Variation 1

The apparatus configuration for realizing the functional configuration of the recording apparatus 10 is not limited to the apparatus configuration shown in FIG. 2. It is possible to use an apparatus having any configuration, as long as the required functions can be realized. For example, the light exposure unit is not limited to the backlight 185 and LCD panel 195. A backlight whose emitted light color can be changed and a transmissive monochrome liquid crystal panel may be used as the light exposure unit.

3-2. Variation 2

The selective transmission layer 240 is not limited to being formed by dispersing a photochromic compound in a transparent resin that has insulation properties. The selective transmission layer 240 may be formed by laminating an insulating layer and a film containing a photochromic compound. In other words, the selective transmission layer 240 may be any layer that includes a compound exhibiting multiphoton absorption properties.

3-3. Variation 3

The specific configuration of the electronic paper 20 is not limited to the description of the exemplary embodiment. For example, the electronic paper 20 may include multiple optical address layers, each of which includes one liquid crystal layer sandwiched between a pair of transparent electrodes. Also, the types of wavelength bands of light reflected by the liquid crystal layers, and the order and combinations of layers is not limited to the description of the exemplary embodiment. For example, a configuration is possible in which the first optical address layer includes the liquid crystal layer 230 (red) and the liquid crystal layer 260 (green), and the second optical address layer that is more toward the face 22b side than the first optical address layer includes the liquid crystal layer 265 (blue). In this case, a configuration is possible in which the second optical address layer includes, more toward the face 22b side than the liquid crystal layer 265 (blue), a photoconductive layer whose resistance decreases upon being exposed to blue recording light whose wavelength peak is 480 nm, and also includes, between the photoconductive layer and the liquid crystal layer 265 (blue), a light absorbing layer that absorbs the wavelength band of light (blue) reflected by the liquid crystal layer 265 (blue) and the blue recording light to be irradiated onto the photoconductive layer. Also, a configuration is possible in which the first optical address layer includes, more toward the face 22b side than the liquid crystal layer 230 (red) and the liquid crystal layer 260 (green), a photoconductive layer whose resistance decreases upon being exposed to red recording light whose wavelength peak is 650 nm, and also includes, between the photoconductive layer and the liquid crystal layers 230 (red) and 260 (green), a light absorbing layer that absorbs the wavelength bands of light (red and green) reflected by these liquid crystal layers and the red recording light to be irradiated onto the photoconductive layer.

Also, in this case, the selective transmission layer 240 may include a photochromic compound that develops the color cyan when irradiated by ultraviolet light, and becomes transparent when then irradiated by visible light. Since the selective transmission layer 240 develops the color cyan, which is the complimentary color (opposing color) of red, by absorbing red light in the color developing state, the selective transmission layer 240 exhibits multiphoton absorbing properties with respect to red light in the color developing state. In other words, almost all of the intense light component of the red light is transmitted, and the weak light component is absorbed and weakened, and therefore the spot diameter of the red recording light exiting the selective transmission layer 240 is smaller than the spot diameter at the time of incidenting on the selective transmission layer 240. Also, the number of liquid crystal layers is not limited to three. A configuration in which 2 liquid crystal layers or 4 liquid crystal layers or more are used is possible.

3-4. Variation 4

Although a diarylethene derivative that develops the color red upon being irradiated with ultraviolet light is used as the photochromic compound in the selective transmission layer 240 in the exemplary embodiment described above, the applicable photochromic compound is not limited to a diarylethene derivative. For example, the photochromic compound used in the selective transmission layer 240 may be a fulgide derivative such as a bismethylene succinic anhydride derivative, or spiropryan, spiroxazine, or the like. Even in this case, there is an increase in the transmissivity with respect to recording light of the photochromic compound used in the selective transmission layer 240 due to photochromism, but it is not necessary for photochromism to be the origin of the color developing unit for causing the photochromic compound whose transmissivity with respect to recording light has increased to return to the color developing state.

In particular, merocyanine, which is a spiropryan photoisomer, has a bipolar structure and therefore has the characteristic that the achromatic state of merocyanine is stable when placed in a nonpolar medium, and the colored state of merocyanine is stable when placed in a polar medium. Accordingly, by including spiropryan in the selective transmission layer 240, and furthermore using a localized dipole field formed by lipophilic ion pairs such as tetrakis[3,5-bis(trifluoromethyl)phenyl]borate (TFPB) or tetrakis[3,5-bis(hexafluoro-2-methoxy-2-propyl)phenyl]borate (HFPB) (particularly $H_3O$ TFPB), it is possible to cause the selective transmission layer 240 to selectively transmit intense light when irradiated by recording light, and cause the entire selective transmission layer 240, including the part that became transparent, to become colored when the irradiation of recording light is stopped. Accordingly, in this case, the medium that applies a localized dipole field to the photochromic compound included in the selective transmission layer is an example of a color developing unit that causes the selective transmission layer to develop a color, and it is unnecessary to provide an apparatus for irradiating the selective transmission layer 240 with ultraviolet irradiation to cause color development, such as the UV lamp 155 and UV lamp controller 150.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical recording display medium comprising:
   a first display layer whose display changes according to an applied voltage;
   a first photoconductive layer that is provided opposing the first display layer and changes a voltage applied to the first display layer according to irradiated light;
   a selective transmission layer that is provided on a light path to where light irradiated toward the first photoconductive layer arrives at the first photoconductive layer, and having a transmissivity with respect to the irradiated light that increases as an intensity of the irradiated light increases;
   a second display layer whose display changes according to an applied voltage; and
   a second photoconductive layer that is provided opposing the second display layer and that changes a voltage applied to the second display layer according to irradiated light,
   wherein the selective transmission layer is provided on a light path to where light transmitted through the second display layer and the second photoconductive layer arrives at the first photoconductive layer.

2. The optical recording display medium according to claim 1,
   wherein the selective transmission layer includes a compound that exhibits multiphoton absorption properties.

3. The optical recording display medium according to claim 1,
   wherein the selective transmission layer includes a photochromic compound.

4. The optical recording display medium according to claim 1,
   wherein the selective transmission layer includes any of diarylethene, spiropryan, and spiroxazine.

5. The optical recording display medium according to claim 1,
   wherein the selective transmission layer includes a compound whose transmissivity with respect to the irradiated light increases as the intensity of the irradiated light increases, and a medium that causes the compound to develop a color by applying a dipole field.

6. The optical recording display medium according to claim 1, wherein the selective transmission layer is an insulant.

7. A recording apparatus comprising:
   an irradiation unit that irradiates light toward an optical recording display medium, the optical recording display medium having:
      a first display layer whose display changes according to an applied voltage;
      a first photoconductive layer that is provided opposing the first display layer and that changes a voltage applied to the first display layer according to irradiated light;
      a selective transmission layer that is provided on a light path to where light irradiated toward the first photoconductive layer arrives at the first photoconductive layer, and having a transmissivity with respect to the irradiated light that increases as an intensity of the irradiated light increases;
      a second display layer whose display changes according to an applied voltage; and
      a second photoconductive layer that is provided opposing the second display layer and that changes a voltage applied to the second display layer according to irradiated light, wherein the selective transmission layer is provided on a light path to where light transmitted through the second display layer and the second photoconductive layer arrives at the first photoconductive layer;
   a voltage application unit that applies a voltage to the optical recording display medium;
   a controller that controls the irradiation unit and the voltage application unit according to image data received as input; and
   a color developing unit that causes the selective transmission layer of the optical recording display medium to develop a color.

8. The recording apparatus according to claim 7,
   wherein the color developing unit causes the selective transmission layer to develop a color by irradiating an electromagnetic wave whose wavelength is different from the light toward the selective transmission layer.

9. The recording apparatus according to claim 7,
wherein the selective transmission layer includes a compound that exhibits multiphoton absorption properties.

10. The recording apparatus according to claim 7,
wherein the selective transmission layer includes a photochromic compound.

11. The recording apparatus according to claim 7,
wherein the selective transmission layer includes any of diarylethene, spiropryan, and spiroxazine.

12. The recording apparatus according to claim 7,
wherein the selective transmission layer includes a compound whose transmissivity with respect to the irradiated light increases as the intensity of the irradiated light increases, and a medium that causes the compound to develop a color by applying a dipole field.

13. The recording apparatus according to claim 7, wherein the selective transmission layer is an insulant.

* * * * *